United States Patent [19]

Doty

[11] 4,321,962
[45] Mar. 30, 1982

[54] SUB-BASEMENT SENSIBLE HEAT STORAGE FOR SOLAR ENERGY

[76] Inventor: Francis D. Doty, 1440 Bonner Ave., Columbia, S.C. 29204

[21] Appl. No.: 138,297

[22] Filed: Apr. 8, 1980

[51] Int. Cl.³ .................. F24D 11/00; F28D 21/00
[52] U.S. Cl. ............................. 165/18; 165/45; 165/48 S; 126/436
[58] Field of Search .......... 165/18, 48 S, 53, DIG. 4, 165/45; 126/400, 436

[56] References Cited

U.S. PATENT DOCUMENTS

| | | | |
|---|---|---|---|
| 2,559,868 | 7/1951 | Gay | 165/45 |
| 2,584,573 | 2/1952 | Gay | 165/18 |
| 3,262,493 | 7/1966 | Hervey | 165/18 |
| 3,369,541 | 2/1968 | Thomason | 126/400 |
| 3,527,921 | 9/1970 | Voglesonger | 165/18 |
| 3,965,972 | 6/1976 | Petersen | 165/45 |
| 4,000,851 | 1/1977 | Heilemann | 126/400 |
| 4,054,246 | 10/1977 | Johnson | 126/400 |
| 4,127,973 | 12/1978 | Kachadorian | 126/400 |
| 4,128,204 | 12/1978 | Wade | 126/400 |
| 4,139,321 | 2/1979 | Werner | 126/400 |
| 4,173,304 | 11/1979 | Johnson | 126/400 |

FOREIGN PATENT DOCUMENTS 2605953 8/1977 Fed. Rep. of Germany ........ 165/45
2814102 10/1979 Fed. Rep. of Germany ...... 126/400

Primary Examiner—Albert W. Davis
Assistant Examiner—Margaret A. Focarino

[57] ABSTRACT

A sensible heat storage method for use in conventional buildings with basements is disclosed that permits the long term storage of solar energy at reasonable efficiency in amounts appropriate for home heating. An exchanger consisting of a plurality of closely spaced, small diameter parallel or serpentine tubes with suitable manifolds is constructed on the central portion of the basement floor. The exchanger is covered with a layer of fine gravel, followed with a layer of waterproof insulation. Finally a second floor is supported on studs resting edgewise on the original basement floor. Horizontal conduction heat losses are reduced by allowing a peripheral margin, insulated from above, about the exchanger and by using a flow reversing system that maintains a horizontal temperature gradient within the exchanger.

8 Claims, 3 Drawing Figures

SUB-BASEMENT SENSIBLE HEAT STORAGE FOR SOLAR ENERGY

REFERENCES CITED

U.S. Patent Documents

| | | | |
|---|---|---|---|
| 4,173,304 | 11/79 | Johnson | 237/1 |
| 4,139,321 | 2/79 | Werner | 405/154 |
| 4,128,204 | 12/78 | Wade | 126/270 |
| 4,127,973 | 12/78 | Kachadorian | 52/169.11 |
| 4,075,799 | 2/78 | Lemelson | 52/169.11 |
| 4,054,246 | 10/77 | Johnson | 237/1 |
| 4,051,891 | 10/77 | Harrison | 126/400 |
| 4,000,851 | 1/77 | Heilemann | 237/1 |
| 3,983,929 | 10/76 | Thomason | 126/400 |
| 3,965,972 | 6/76 | Peterson | 237/1 |
| 3,527,921 | 9/70 | Vogelsonger | 165/45 |
| 3,412,728 | 11/68 | Thomason | 165/DIG. 4 |
| 3,369,541 | 2/68 | Thomason | 126/400 |
| 3,353,309 | 11/67 | Kwake | 52/2 |
| 3,262,493 | 7/66 | Hervey | 165/18 |
| 3,239,144 | 3/66 | Lueder | 237/1 |
| 2,584,573 | 2/52 | Gay | 165/45 |

OTHER REFERENCES

*CRC Handbook of Chemistry and Physics*, 57 ed.
Nicholls, R., Optimal Proportioning of an Insulated Earth Cylinder for Storage of Solar Heat, *Solar Energy*, 19, 711, (1977)
Shelton, J., Underground Storage of Heat in Solar Heating Systems, *Solar Energy*, 17, 137, (1975)

BACKGROUND OF THE INVENTION

This invention pertains to adapting conventional buildings with basements to the use of renewable energy sources by providing a low cost method of storing large amounts of energy from one season to the next. It is based on the well known principle of storage in a semi-infinite reservoir, generally of uniform specific heat and thermal conductivity. The theory for such reservoirs of hemispherical shape is well known (Shelton) and many methods have been disclosed for implementing such storage in home dwellings. However, the prior methods generally require the storage system to be built into the home at the time of construction (U.S. Pat. Nos. 4128204, 4127973, 4000851, 3527921, 3262493, 2584573), or else they entail expensive excavation at a later time (U.S. Pat. Nos. 4173304, 4139321, 4054246, 3262493). That is, the heat exchangers are either below the concrete slab or else located in an external buried tank, trench or rock pile. In the present invention, the heat exchanger is laid on the upper surface of the basement slab, thereby allowing it to be installed in existing structures and maintained if necessary at minimal cost and inconvenience. Before describing such an approach in detail, it will be worthwhile to review some relevant theory and data so as to clearly establish the viability of this approach.

It can be shown that the steady state thermal conductivity $K_c$ of a cylindrical exchanger tube in a cylindrical medium is given by $$K_c = 2\pi k/(\ln r_b - \ln r_a), \qquad (1)$$

where k is the thermal conductivity of the medium, $r_a$ is the radius of the exchanger tube, and $r_b$ is the radius of the medium.

The time dependence of an exchanger in a medium can be described by a thermal time constant equal to the ratio of the energy stored to the exchange power at a given temperature difference. For a cylindrical system in which $r_b$ is much greater than $r_a$, the thermal time constant $t_c$ is given approximately by $$t_c = 0.5 r_b^2 H (\ln r_b - \ln r_a)/K_s \qquad (2)$$

where H is the volume specific heat of the medium.

For a rectangular prism reservoir of depth x with a planar exchanger of area A on a major surface and with x less than the width or length of the planar exchanger, it can be shown that the thermal time constant $t_p$ is given approximately by $$t_p = 0.5 x^2 H/K \qquad (3)$$

For uninsulated reservoirs the fractional loss of energy per unit time, D, is given approximately by the reciprocal of the thermal time constant t when t is much greater than unity.

$$D = t^{-1}. \qquad (4)$$

The average thermal conductivity of well packed soils and gravel beds is about 1 W/m·K and the average conductivity of solid rock and concrete is about twice that amount. The volume specific heat of most solids is about 800 Wh/m$^3$K. Tables I and II show typical values obtained from the above equations for various conditions with an assumed thermal conductivity of 1 W/m·K and an assumed volume specific heat of 800 Wh/m$^3$K. The energy stored is given in watt hours per meter of tube length °K. for cylindrical storage, while it is given in watt hours per square meter of exchanger area °K. for rectangular storage. The average available power over a time comparable to the thermal time constant is given in watts per meter of length °K. for cylindrical storage, and it is given in watts per square meter of exchanger area °K. for rectangular storage.

TABLE I

| | | Cylindrical Storage | | |
|---|---|---|---|---|
| $r_a$ cm | $r_b$ cm | Power W/m . K | Energy Wh/m . K | Time Constant Hours |
| .15 | 3 | 2.1 | 2.3 | 1.1 |
| .23 | 3 | 2.4 | 2.3 | .95 |
| .31 | 3 | 2.9 | 2.3 | 0.9 |
| .15 | 5 | 1.8 | 6.3 | 3.5 |
| .23 | 5 | 2.0 | 6.3 | 3.1 |
| .31 | 5 | 2.4 | 6.3 | 2.6 |
| .15 | 7 | 1.6 | 12 | 7.5 |
| .23 | 7 | 1.8 | 12 | 6.7 |
| .31 | 7 | 2.1 | 12 | 5.7 |

TABLE II

| | | Rectangular Storage | | |
|---|---|---|---|---|
| Depth m | Power W/m$^2$ K | Energy Wh/m$^2$ K | Time Constant Days | Loss per day % |
| .05 | 40 | 40 | .04 | 99.99 |
| .1 | 20 | 80 | .16 | 99.8 |
| .2 | 10 | 160 | .66 | 73 |
| .5 | 4 | 400 | 5 | 20 |
| 1 | 2 | 800 | 17 | 6 |
| 2 | 1 | 1600 | 68 | 1.5 |
| 4 | .5 | 3200 | 260 | 0.4 |
| 8 | .25 | 6400 | 1000 | 0.1 |

The heat energy needs for a typical well-insulated single family dwelling with a basement are about 5000 kWh/year for hot water and about 15,000 kWh/year for building heat. To furnish 20,000 kWh of energy in twelve months will require about 50 m² of high efficiency solar collector area on a steep sloping south roof or wall. The hot water needs are approximately constant throughout the year while half of the total energy for building heat is required during a two month period.

The average energy output from the 50 m² solar collector during the two months of greatest need will be only about 1000 kWh. Thus the storage system must be capable of supplying at least 7000 kWh in two months. For a planar exchanger this much energy must be stored within a depth of 2 m or less to have a time constant of two months. For 40° C. above ambient temperature, this requires 220 m³ of earth with a surface area of 110 m².

The maximum summer time output from the 50 m² collector will be about 250 kWh in an eight hour period. Thus the reservoir must be capable of storing 250 kWh within 14 cm of the exchanger surface. With 110 m² of exchanger area the average temperature rise will be about 20° C. to a depth of 14 cm. But for maximum collector efficiency, the temperature rise here should be as small as possible. If the top side of the planar exchanger is covered with about 14 cm of well-packed gravel, the exchanger area will be effectively doubled for time periods of eight hours or less since it is now conducting both upward and downward. This will reduce the average temperature rise to about 10° C. and will increase the collector efficiency by 10 to 20 percent.

Such a planar exchanger is well approximated by an array of small diameter tubes over a plane surface such as a concrete slab. Optimum spacing between the tubes is determined by the criterion that the total thermal conductivity of the tubes be about twice the thermal conductivity of a planar exchanger of the same area over a period of about eight hours. From the two tables it is seen that the optimum spacing is about 5 cm to 7 cm for tubes of 3 mm to 6 mm diameter in earth.

To allow maximum spacing of the tubes in the exchanger, the depth of the gravel bed should be at least equal to one third the distance between the tubes so as to establish good thermal contact between the tubing and the slab. Gravel bed thicknesses up to 15 cm are useful for improving the peak power efficiency. The gravel packing density, and subsequently both the thermal conductivity and heat capacity, may be increased by wet mixing gravel and sand in the ratio of about four parts gravel to one part sand. The addition of about 5% binder will further increase the thermal conductivity as will the addition of about 2% shredded aluminum. (The binder may be desirable where flooding is likely.) When account is taken of the increased thermal conductivity of the concrete slab and the composite gravel mixture, the optimum spacing between 5 mm tubes may be as much as 12 cm.

From equation 1 it is clear that there is little thermal advantage in using large diameter exchanger tubes. The only significant criterion is that the tube diameter be large enough to handle the required water flow rate with viscosity energy losses that are small compared to the thermal energy of the water. This requires the pump pressure to be small compared to the sensible energy per unit volume in the water. A pump pressure of 4 Nt/cm² (6 psi) per °C. of temperature difference between the water and the reservoir will result in an energy loss of only 1% for pumps with 50% efficiency. From Poiseville's equation it can be shown that this will provide sufficient flow rate of water to accommodate the peak power capacity of 1.5 mm I.D. tubes (⅛" O.D.) up to 25 meters in length with a water temperature drop of only 5° C., or 3 mm I.D. tubes (3/16" O.D.) up to 100 meters in length. The tubing size used for the manifolds must be larger so as to allow uniform water distribution. For a typical system employing 48 tubes, each 30 m long with 3 mm I.D., the manifold tubing diameter should be 3 cm. The maximum water pressure drop through such an exchanger will be only 2 Nt/cm² (3 psi) since the required pressure is proportional to the square of the exchanger tube length and inversely proportional to the fourth power of the tube radius at low flow velocities.

The pump must be capable of supplying up to one liter per sec (15 gal/min) for efficient operation of a 50 m² solar collector during peak periods. Clearly, this capacity is not required continually and a multispeed pump would have three distinct advantages: first, lower power consumption during periods of low demand; second, extended life; and third, improved thermodynamic efficiency of the reservoir when used in conjunction with a flow reversing system as explained later.

The insulation covering the exchanger and gravel bed must be thick enough to keep the upward conduction power loss small compared to the average power of the collector—a mere 2.3 kW for the typical case. It can be shown that the thermal conduction required of the insulation is a function only of the following: the conductivity of the soil, the period of time the energy is to be stored, and the surface losses allowable. Assuming a soil conductivity of 1 W/m·K., an average annual supply and demand cycle, and an allowable surface loss of 30%, the thermal conduction of the insulation layer must be less than 0.3 W/m² K. For the best insulations this will require a thickness of 10 cm, but twice this thickness is required for the more common insulating materials. Thermal conduction through the support framework may contribute significantly to the losses. It can be reduced by using a multilayer grid of studs or by simply supporting the studs at appropriate intervals on blocks, etc. Low conductivity alloy (stainless steel) nails are also useful in reducing the conduction through the support means. Further increases in the thickness of the insulation will improve the storage efficiency but this is of little real significance, since the reservoir temperature and losses will peak in the late fall at which time the upward heat losses into the basememnt would be of benefit and not represent wasted energy.

Although the prior art seems convinced of the merits of an insulated wall about the periphery of the reservoir, a much less expensive and more effective approach is to allow a margin of at least one meter, preferably two meters, about the periphery of the basement floor that is covered with insulation but not with the exchanger and gravel bed. However, in areas of profuse aquafiers, a vapor and moisture barrier to a depth of two meters about the periphery of the building is desireable.

The peripheral losses of the reservoir may further be reduced by employing a system of control valves and mainfolds that directs the water flow generally outward from the center of the exchanger during times when the power supply exceeds the demand, and that reverses the water flow during times when the demand exceeds the supply. For maximum benefit such a system requires a variable speed pump in which the flow rate is limited by temperature sensors in the exchanger bed and ports so as to maintain a significant horizontal temperature gradient throughout the exchanger. A suitable flow rate criterion during times of net power storage is that the water temperature drop through the exchanger be maintained at about 10° C. Such a control system will substantially reduce the losses of a storage bed in which the insulated peripheral margin is less than one meter. However, it will also reduce the solar collector efficiency somewhat due to the increased water temperature. Thus the net benefits are relatively minor. Nevertheless, a flow reversing system remains an economically justifiable technique for reducing the required width of the insulated peripheral margin.

SUMMARY OF THE INVENTION

The present invention consists of (1) an optimally designed exchanger laid on the top surface of the central portion of a basement slab so as to reduce installation and maintenance costs and to reduce basement sealing problems compared to sub-slab exchangers; (2) a shallow layer of clean, well packed gravel and sand to improve thermal contact between the exchanger and slab and to increase short term energy storage for increased peak power capacity; (3) a substantial layer of thermal insulation, preferably waterproof, covering the exchanger and gravel and extending horizontally beyond such to form an insulated horizontal peripheral margin, thereby reducing heat loses from the edge of the reservoir due to both conduction and ground water flow; and (4) a system of temperature sensors, valves, manifolds, and controllers designed to produce a controlled working fluid flow generally outward from the center of the exchanger when the power supply exceeds the demand and generally inward when the power demand exceeds the supply so as to further reduce the heat losses from the edge of the reservoir by maintaining a positive horizontal temperature gradient from the edge to the center of the reservoir.

DETAILED DESCRIPTION OF A PREFERRED EMBODIMENT

Figure 1:
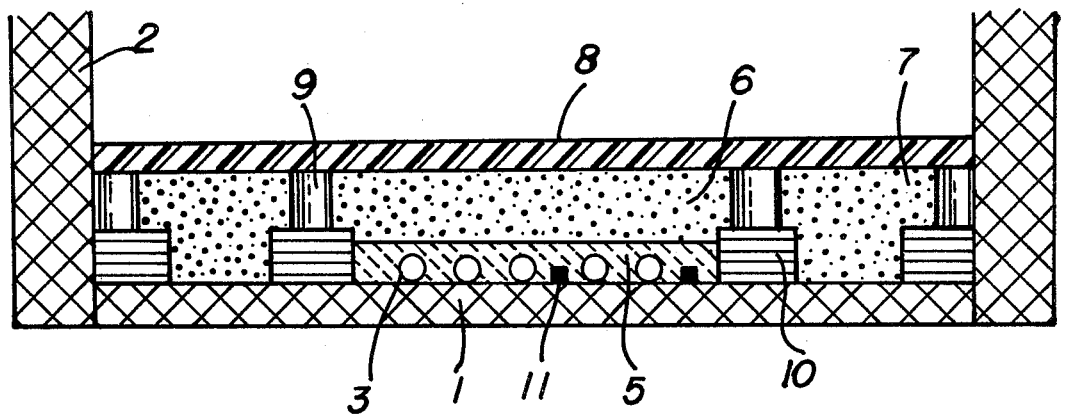
FIG. 1 is a cross section view showing the exchanger above the basement slab.
Figure 2:
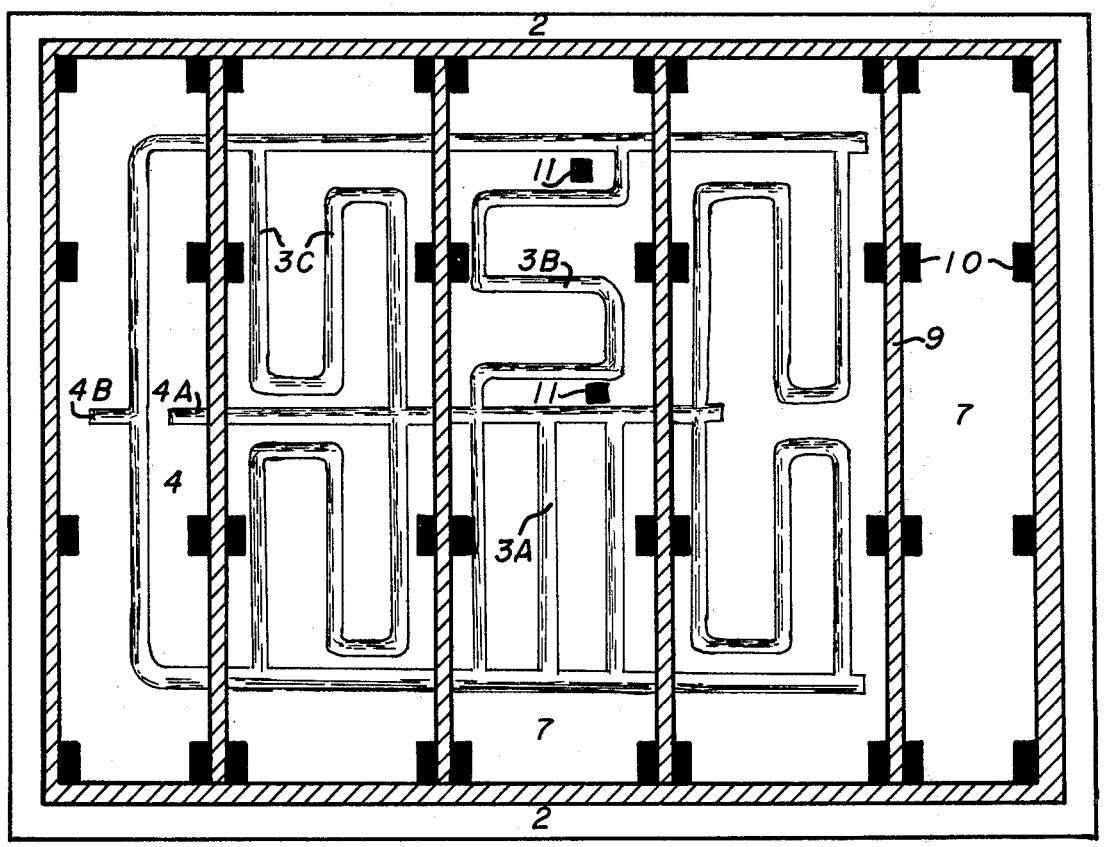
FIG. 2 is a floor plan view illustrating parallel and serpentine exchanger networks.

Referring now to FIGS. 1 and 2 we see a concrete slab 1 forming the lowest level floor, the original basement floor, with the basement walls 2 around it. Laid directly onto the surface of this floor is an exchanger composed of a plurality of small diameter—typically 0.5 cm—tubes 3 spaced about 8 cm apart in parallel or serpentine fashion with suitable manifolds 4 about 3 cm in diameter. The inlet port is at 4a when the power supply exceeds the demand, but it is at 4b when the power demand exceeds the supply. A longitudinal serpentine pattern 3c is recommended at both ends of the exchanger and a transverse serpentine pattern 3b is recommended elsewhere. The parallel pattern 3a is recommended only for very large reservoirs. Aluminum tubes are preferred over copper because of the reduced cost. Fluid tight joints can easily be made with a settable sealant such as epoxy or silcone rubber. Corrosion problems may be addressed by lining the tubes with a polymer, by adding pH buffers and corrosion inhibitors to the working fluid, or by using a non-corrosive working fluid such as ethylene glycol or a light oil, with appropriate changes in flow rates and tubing sizes.

A layer of about 10 cm of clean, well packed gravel and sand 5 in the ratio of about 4 to 1 is laid over the exchanger. A layer of insulation 6 covers the gravel bed and extends beyond the exchanger to form an insulated margin 7 about the periphery of the exchanger. A second floor 8 is built above the insulation supported on suitable studs 9 resting on blocks 10 on the original basement floor 1. Temperature sensors 11 are located near the center and near one or more sides and in both fluid ports 4a, 4b when a flow reversing system is used to maintain a horizontal temperature gradient.

Figure 3:
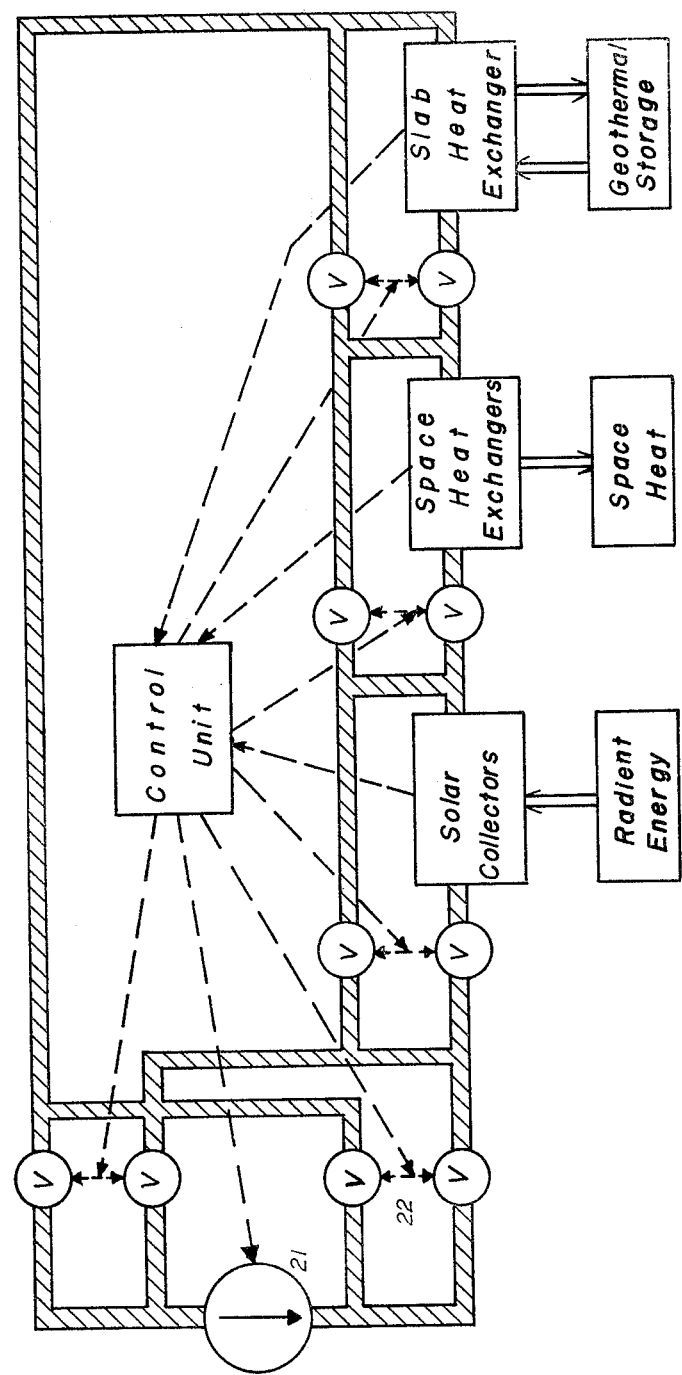
FIG. 3 is a system diagram.

FIG. 3 illustrates a method of producing the required bi-directional fluid circulation by means of a pump 21 and five pairs of valves 22. In each pair of valves, exactly one valve is open and one valve is closed at any given time. The control unit senses the temperatures at various places and controls the pump and valves as required to produce the desired energy exchange according to the assessed conditions.

The invention has been shown with reference to a preferred embodiment thereof. Variations and modifications of the invention will be apparent to persons skilled in the art without departing from the inventive concepts disclosed herein. All such modifications and variations are intended to be within the scope of the present invention as defined in the following claims.

I claim:

1. A system for the storage of heat or cold in the earth below a concrete slab, uninsulated from beneath, forming the lowest floor in a building, said system including
    a working fluid heat exchanger immediately above and in thermal contact with said slab,
    a layer of heat absorptive material substantially covering said exchanger,
    a layer of heat insulating material covering said heat absorptive material and extending horizontally beyond said exchanger so as to form an insulated peripheral margin,
    a second floor above said insulating material with suitable support means disposed between said slab and said second floor.

2. A heat storage system as claimed in 1 above with valves, manifolds, sensors, variable capacity fluid circulation means and control system that maintains a positive temperature gradient from the edge of said exchanger to the center by introducing the working fluid at a controlled rate from the peripheral edge of the exchanger when the power demand exceeds the power supply but from the center of the exchanger when the power supply exceeds the demand.

3. A heat storage system as claimed in 1 above in which said second floor support means consists of studs resting edgewise on blocks spaced about 0.5 m apart, said blocks resting on said slab and extending above said heat absorptive material.

4. A heat storage system as claimed in 1 above in which said heat exchanger consists of a plurality of suitably manifolded tubes of about 0.3 to 0.7 cm outer diameter spaced about 4 to 20 cm from adjacent tubes.

5. A heat storage system as claimed in 1 above in which said heat absorptive layer is less than 20 cm thick but more than 1 cm thick.

6. A heat storage system as claimed in 1 above in which said layer of heat insulating material has a vertical thermal conduction of about 0.3 $W/m^2K$ or less.

7. A heat storage system as claimed in 1 above in which said second floor is afixed to said support means with low conductivity alloy fasteners.

8. A heat storage system as claimed in 1 above in which working fluid is introduced from the peripheral edge of said exchanger when the power demand exceeds the power supply, but said fluid is introduced from the center of said exchanger when the power supply exceeds the power demand.

* * * * *